United States Patent [19]

Baumann, III

[11] Patent Number: 5,270,133
[45] Date of Patent: Dec. 14, 1993

[54] CASELESS BATTERY

[75] Inventor: Charles J. Baumann, III, Wauwatosa, Wis.

[73] Assignee: Globe-Union Inc., Milwaukee, Wis.

[21] Appl. No.: 26,269

[22] Filed: Mar. 4, 1993

Related U.S. Application Data

[63] Continuation of Ser. No. 624,197, Dec. 6, 1990, abandoned.

[51] Int. Cl.$^5$ ............................................. G03G 17/00
[52] U.S. Cl. ...................... 429/53; 427/422; 427/421; 264/279.1; 264/279; 29/623.1; 29/623.5; 429/54; 429/103; 429/153; 429/176; 429/181; 429/185; 429/225
[58] Field of Search ............... 429/153, 53, 54, 103, 429/176, 181, 185, 225; 29/623.1, 623.5; 427/422, 421; 264/279.1, 279

[56] References Cited

U.S. PATENT DOCUMENTS

| | | | |
|---|---|---|---|
| 1,564,766 | 12/1925 | Edgeworth | 429/176 |
| 4,524,509 | 6/1985 | Wegner | 29/623.5 |
| 4,530,153 | 7/1985 | Pearson | 29/623.1 |
| 4,664,994 | 5/1987 | Koike et al. | 429/163 |
| 4,758,482 | 7/1988 | Yamana et al. | 429/53 |
| 4,885,007 | 12/1989 | Wegner | 29/623.5 |

FOREIGN PATENT DOCUMENTS

| | | | |
|---|---|---|---|
| 60-74360 | 4/1985 | Japan | 29/623.1 |
| 60-257063 | 4/1985 | Japan | 29/623.1 |
| 1407834 | 9/1975 | United Kingdom | 429/176 |

OTHER PUBLICATIONS

Survival of the Toughest Brochure, Permatex Industrial Corporation, a Subsidiary of Loctite Corporation, 100M/Nov. 1988, Px-529-E.

*Primary Examiner*—Mark L. Bell
*Assistant Examiner*—C. M. Bonner
*Attorney, Agent, or Firm*—Foley & Lardner

[57] ABSTRACT

A battery is prepared by dipping battery elements (which may be surrounded by a thin, lightweight material, such as a plastic bag) into a liquid encapsulating, acid-resistant liquid material such as a rubber or resin. Individual elements can be connected either before or after hardening of the liquid to create a battery of the desired voltage. Heavy thermoplastic resin containers need not be used, and the weight of the resultant battery is thereby substantially reduced.

15 Claims, 2 Drawing Sheets

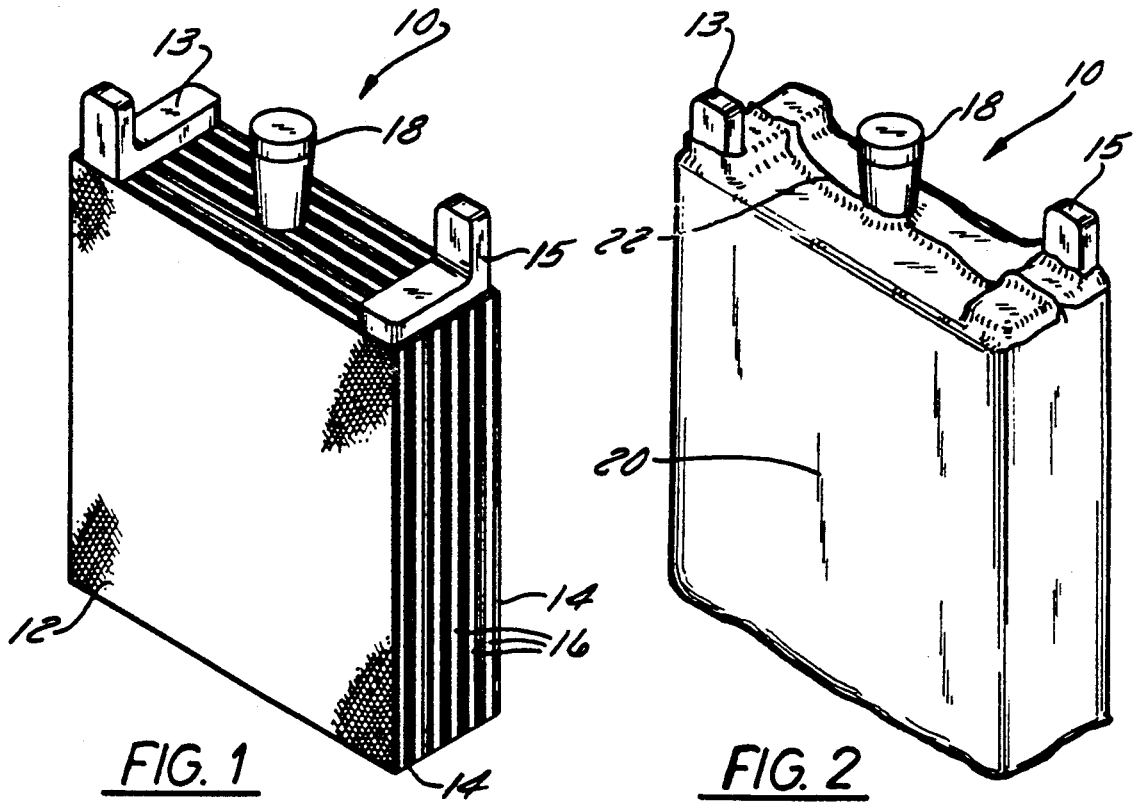
FIG. 1
FIG. 2
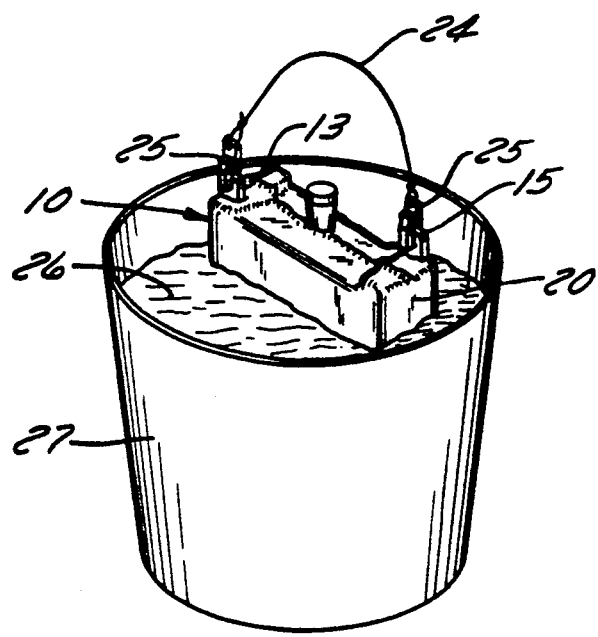
FIG. 3

CASELESS BATTERY

This is a continuation of application Ser. No. 07/642,197 filed Dec. 6, 1990, now abandoned.

BACKGROUND OF THE INVENTION

1. Field of the Invention

The present invention relates generally to batteries of the multi-cell lead acid type and more particularly to a system which eliminates the rigid case employed in prior battery systems. Still more specifically the present invention relates to batteries in which battery elements are encapsulated in an acid-resistant, self-curing liquid such as a rubber or resin.

2. Description of the Prior Art

In the manufacture of batteries of the SLI variety, such as those employed with automotive electrical systems, it is well-known to employ a thermoplastic case surrounding the individual battery elements. The elements are typically combined by welds, soldering or straps to provide the desired voltage, with the casing providing containment for the electrolyte employed with the system. The individual elements frequently include a plurality of positive plates and negative plates with intermediate separators. Numerous prior art devices disclose such systems. In most systems used today, a cover, which may include suitable venting systems, is employed to provide for battery maintenance and for relief of gaseous pressures that may be generated in the harsh environment of a lead-acid battery.

There has been a recognized need for many years to reduce the weight of battery components, especially those used in automotive applications and the like, and the heavy thermoplastic containers used with present battery systems contribute to the problem Moreover, with different automobile models and for different size batteries, numerous molds must be made for preparing the containers. Prototype development proceeds slowly for this reason. Moreover, shipping of the containers is costly because of the amount of air transported with the thermoplastic casings (which do not fully nest), and warehouse floor space is taxed by large stacks of empty storage containers. It would be highly desirable to be able to prepare batteries without using the conventional thermoplastic containers, especially if a system could be developed which would allow prototypes to be developed more rapidly and which would eliminate shipping costs and permit processing of the batteries using other components in the manufacturing system which are presently in place.

The idea of surrounding battery components with plastic film is itself known in the art as illustrated by U.S. Pat. No. 4,530,153 issued Jul. 23, 1985 to Pierson for "Manufacturing Recombination Electric Storage Cells". In this patent, a recombination storage cell is prepared by pasting positive and negative electrode grids with damp electrode material and forming a cell pack of alternating positive and negative materials interleaved with separators. The cell pack is inserted into a plastic bag while the active electrode material is still damp and the electrodes are dried within the bag by subjecting them to temperatures in excess of 25° C. The cell pack is then inserted into a typical battery container.

Small lead storage batteries which are enclosed in plastic film are also disclosed in U.S. Pat. No. 4,664,994 issued May 12, 1987 to Koike, et al. for "Enclosed Lead Storage Battery And Process For Producing The Same". In this patent, a plate assembly comprising a positive and negative plate with an intermediate separator is surrounded by a jacket made of film- or sheet-formed synthetic resin. The film is a multi-layer laminate and a system is disclosed for permitting the terminals of the electrode to be sealed to the film. A venting technique is also disclosed. The patent does not disclose combining elements to form batteries of the type involved in the present invention. In the preferred embodiment of the Koike, et al. patent, a heat sealable polyolefin film is provided on the facing surfaces of the film laminate.

Another system for preparing a lead-acid battery is disclosed in U.S. Pat. No. 4,758,482 issued Jul. 19, 1988 to Yamana, et al. entitled "Enclosed Type Lead Batteries And Method For Producing The Same". In this device, a plate stack having its ears connected to terminals contained in a synthetic resin cap is surrounded by an enclosure formed of film or sheet synthetic resin. The film is thermally fused at the peripheral edge of its opening to the cap. Completed elements, according to the inventors, can be placed into a case thereby resulting in some reduction in the cost of manufacturing high performance enclosed lead-acid batteries.

Several patents exist in the battery art which describe processes for dipping various battery components in certain materials. See, for example, U.S. Pat. No. 4,524,509 issued Jun. 25, 1985 to Wegner for "Enveloping A Battery Plate By Dip Process And Product Produced Thereby" (dipping a plate to provide a microporous battery separator material thereon) and U.S. Pat. No. 4,885,007 issued Dec. 5, 1989 to Wegner for "Dip Process For Enveloping A Battery Plate" (also forming a separator envelope about a battery plate).

A system for preparing battery elements and completed batteries which avoids certain fabrication problems with prior art systems and results in battery elements with reduced weight would be a significant advance in the art.

SUMMARY OF THE INVENTION

In the present invention, a battery element is prepared by providing battery elements having positive and negative pasted plate with separators sandwiched therebetween. Each element is preferably placed into a plastic bag, and a vent support may be provided for gases of formation and/or for relief of other gas pressures which may develop in the harsh battery environment. The elements are then dipped into an encapsulating material, such as a rubber or resin system and removed from the dip tank and allowed to cure.

In another feature of the invention, the individual elements may be soldered together and boxed in a lightweight casing, such as one made from corrugated paperboard.

In yet another feature of the invention, the individually dipped elements are dipped again after being combined to form a second layer of surrounding encapsulation.

Other features of the invention will become readily apparent to those skilled in the art after the present application is read and understood. Such features are deemed to fall within the scope of the invention if they fall within the scope of the claims which are appended hereto.

DESCRIPTION OF THE DRAWINGS

FIG. 1 is a perspective view of an individual battery element with vent support used in the preferred form of the present invention;

FIG. 2 is a perspective view of the battery element of FIG. 1 in a surrounding plastic bag;

FIG. 3 is a perspective view of the bag-covered element shown in FIG. 2 being dipped into a container of encapsulating material;

In the various drawings, like reference numerals are used to illustrate like components.

DESCRIPTION OF THE PREFERRED EMBODIMENT

Figure 4:
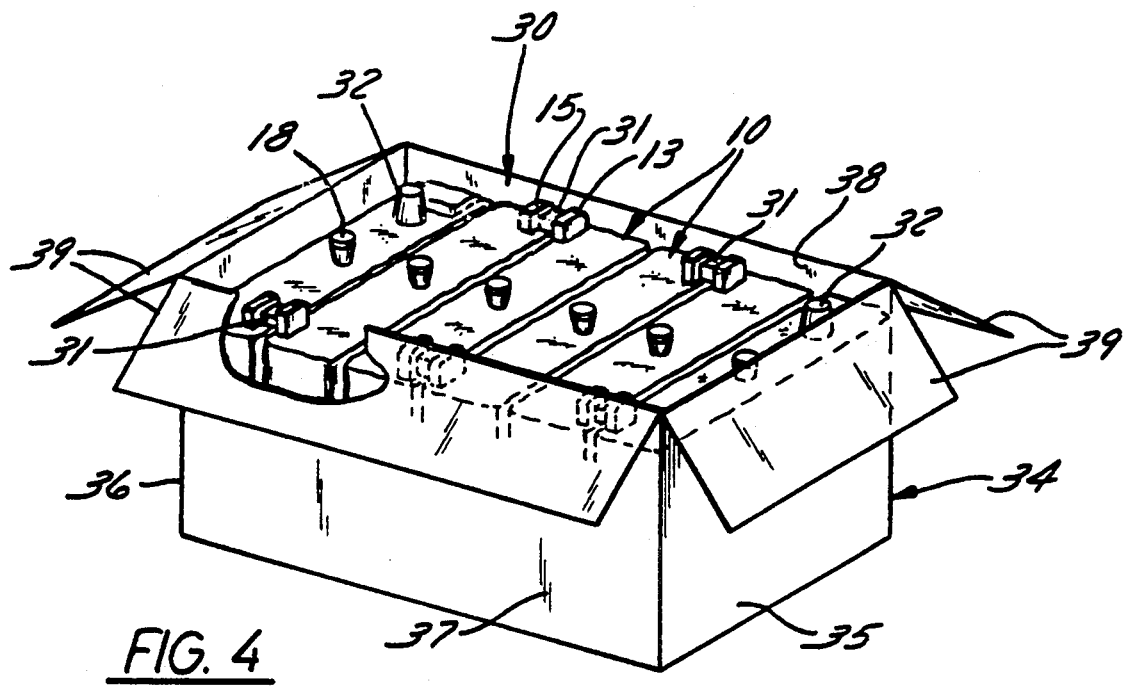
FIG. 4 is a perspective view of six of the elements shown in FIG. 1 combined together and boxed for use as an SLI battery.

Before proceeding to a description of the preferred embodiment of the invention, several general comments can be made. First, the particular materials used for the positive and negative plates of the battery elements will not be described in detail because, in and of themselves, such materials do not form a part of the present invention. Typical lead or conductive particle-filled resin solid or perforate grids may be employed. The positive paste material and negative paste material can be of the type generally known to the lead-acid battery art. The particular size and shape of the plates is also not critical and will depend upon the ultimate use of the battery and the desired electrochemistry of the particular system. Also, while a vent of general configuration is shown, other vents known in the battery art may be employed, including those which are designed to prevent explosion. Various strapping and collector techniques well known to the battery art can be employed with batteries prepared according to the teachings of the present invention.

FIG. 1 shows in simplified perspective form a battery element 10 according to the preferred form of the invention. Battery element 10 includes plates 12 pasted with positive paste material, plates 14 pasted with negative paste material and separators 16 located therebetween. Current collector tabs 13 and 15 extend respectively from the upper portions of the positive and negative plates, respectively, as is well known. The separators can be any typical material used in the leadacid art, such as glass mat and the like.

A vent, or a temporary plug 18, is disclosed in FIG. 1 and is provided in a bridging location. The vent design may be varied widely and may include the duck-bill type of vent disclosed in the aforementioned Koike, et al. patent or may have a more typical vent design used in common automotive batteries of present construction.

Proceeding next to FIG. 2, the element 10 is shown within a plastic bag 20. Bag 20 may be made of any suitable acid-resistant material, such as a polyolefin (e.g. polyethylene, polypropylene and the like). The important characteristic for the bag is that it be capable of containing the battery elements described in FIG. 1 together with the electrolyte, typically sulfuric acid (not shown), used in modern lead-acid battery systems. While a bag 20 is not critical to the invention and batteries may be made without the bag, the plastic provides a smooth surface with is ideal for proper adhesion of the encapsulating material.

The bag 20 includes an upper edge 22 located above the top of the respective plates 12 and 14, which edge is sealed around the collector tabs 13 and 15 as well as the vent 18 to form a generally enclosed system. Sealing can be accomplished by adhesives, by the thermoplastic techniques suggested by Koike, et al. or any other equivalent system (see, for example, that used in the aforementioned Yamana, et al. patent).

Proceeding next to FIG. 3, a string 24 is coupled to the respective battery collector tabs 13 and 15 using spring clips 25. The string is used to lower battery element 10 into a quantity of encapsulating material 26 retained in any suitable container 27. Simply dipping the bag covered element will encapsulate it in the encapsulating material.

The preferred encapsulating materials are those which will air dry, cure or otherwise solidify upon removal of the element 10, although heat curing could also be employed One preferred encapsulating material is Color Guard coating available from T&A Industrial Distributors located at 1806 West Pierce Street, Milwaukee, Wis. Color Guard coating is a product of Permatex Industrial Corporation of Avon, Conn. and Color Guard is a trademark of Locktite and Permatex. The material is advertised as being a material which can protect, seal, insulate and restore by protecting against corrosion, noise and shock Its manufacturers advertise that it will not chip or crack (like a paint) and that it will stand up to sun, salt spray and extreme weather A technical brochure describing this material is provided with this specification and is entitled "Survival of the Toughest". Other rubber systems, whether synthetic or natural, and various synthetic resin materials could also be employed Preferred are those systems which provide a thin coating (for weight reduction) which will yield the desired encapsulation and physical properties which are required for the applications described herein. Coating which is provided on the individual elements 10 is shown in the drawing as reference 21 in the remaining drawings.

FIG. 4 is an illustration of one typical combination of individual battery elements 10. The elements are combined into a single battery structure 30 using conventional straps 31 and terminals 32. Battery 30 is encased in a paper container 34, in this case a corrugated container having end walls 35 and 36, side walls 37 and 38 and top flaps 39. Any other type of lightweight container could be used, or the outer container could be eliminated altogether since the encapsulating material 26 provides all the structural toughness that is normally required Container 34 provides a surface for advertising, as well as an enhanced appearance for the dipped battery of the present invention.

Figure 5:
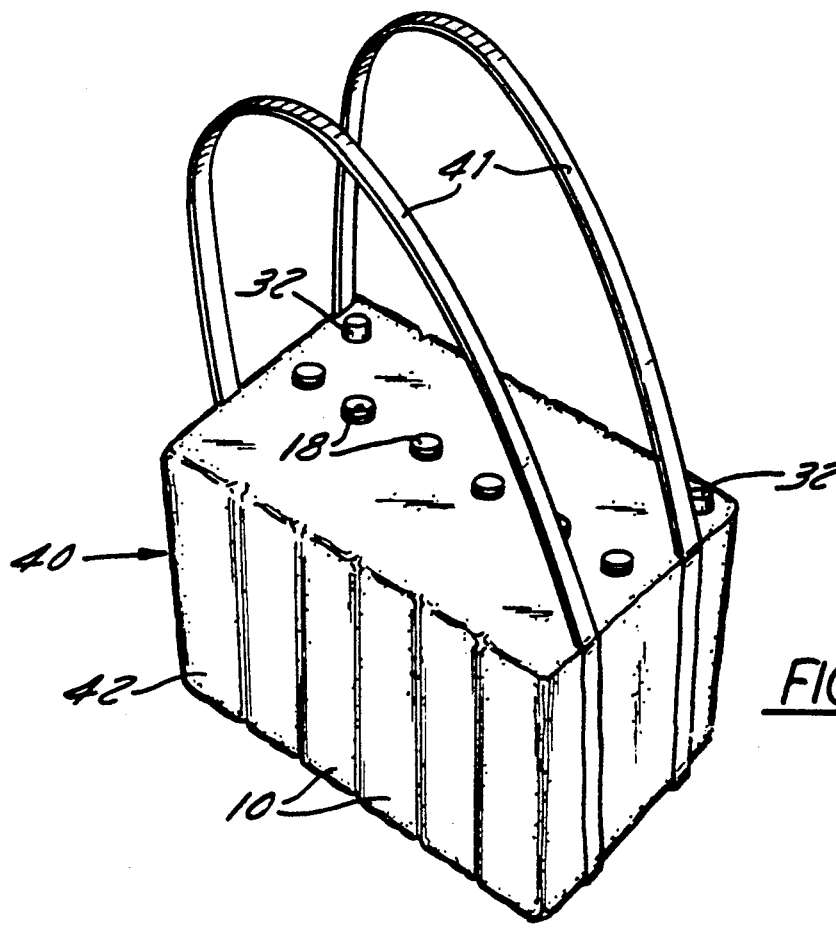
FIG. 5 is an alternate embodiment of the present invention in which a combination of six individual elements is shown encapsulated in a surrounding second layer of encapsulating material.

In FIG. 5, an alternate embodiment is shown, wherein a combination 40 of elements 10 is provided with a second, surrounding coating 42 of the encapsulating material 26 and a pair of more permanent handles 41 are attached to the battery. The encapsulation of individual elements is followed by a second encapsulation step to avoid the necessity for any type of additional container. However, a lightweight, corrugated container such that described above can be employed for the twice encapsulated battery elements and combined battery shown in this FIGURE.

Prototypes built to date demonstrate that batteries prepared according to the present invention can be fabricated quickly, without the need for preparing complex molds. There is no need to manufacture, ship or store thermoplastic cases of the type heretofore used.

As previously indicated, numerous other modifications may be made once the principles of the invention have been read and understood. While a preferred and an alternate embodiment have been described, the invention is not limited to the embodiments disclosed, but is to be limited solely the scope of the claims which follow.

What is claimed is:

1. A battery element comprising a plate stack having a top, bottom, sides and made from one or more plates pasted with positive paste material, one or more plates pasted with negative paste material and separators located between the plates, acid electrolyte for the stack, a polymeric bag enclosing at least the bottom and sides of the stack and a coating of encapsulating material enveloping the bag with a liquid, the encapsulating material having been applied by the process of covering the outer surface of the bag with a liquid, air-curable, solvent-containing, acid-resistant polymer selected from the group consisting of natural rubber, synthetic rubber and synthetic resin encapsulating material and allowing the encapsulating material to harden.

2. The battery element of claim 1 further comprising vent means for allowing gases generated within the stack to be vented.

3. The battery element of claim 1 further comprising a paper container for the encapsulating bag.

4. The battery element of claim 3 wherein the paper container is a corrugated paperboard container.

5. The battery element of claim 1 wherein the step of covering comprises dipping the bag into a quantity of liquid encapsulating material and raising the covered bag therefrom.

6. The battery element of claim 1 wherein the step of covering comprises spraying the bag with liquid encapsulating material.

7. A battery comprising a plurality of battery plate stacks, each of the elements comprising a plate stack having a top, bottom, sides and made from one or more plates pasted with positive paste material, one or more plates pasted with negative paste material, and separators therebetween, electrolyte for the plate stacks, a polymeric bag encasing at least the bottom and sides of each plate stack, each of the bags also including a coating of encapsulating material enveloping the outer surface of its bags, the encapsulating material being applied by the process of covering the bags with liquid, air-curable, solvent-containing, acid-resistant polymer selected from the group consisting of natural rubber, synthetic rubber and synthetic resin encapsulating material and allowing the encapsulating material to harden.

8. The battery of claim 7 wherein each of the elements further comprises vent means for allowing gases generated with the stacks to be vented.

9. The battery of claim 7 wherein the individually encapsulated bags are collectively encapsulated in a second layer of hardened encapsulating material.

10. The battery of claim 7 further comprising a paper container for the bags.

11. The battery of claim 10 wherein the container is a corrugated paperboard container.

12. The battery of claim 7 wherein the step of covering comprises dipping said bags into liquid encapsulating material.

13. The battery of claim 7 wherein said step of covering comprises spraying the bags with liquid encapsulating material.

14. A method of preparing a battery element comprising the steps of:
a) providing a battery plate stack including a top, bottom, sides and made from one or more plates pasted with positive material, one or more plates pasted with negative paste material and separators therebetween;
b) providing a polymeric bag around at least the bottom and sides of the plate stack;
c) applying to the exterior of the bag a coating of a liquid, air-cured, solvent-containing, acid-resistant polymer selected from the group consisting of natural rubber, synthetic rubber and synthetic resin encapsulating material; and
d) allowing the encapsulating material to harden.

15. The method of preparing a battery including a plurality of battery elements, each of the elements having a top, bottom and sides and being prepared by the steps of:
a) providing a plurality of battery plate stacks, each containing one or more plates pasted with positive paste material, one or more plates pasted with negative paste material and separators therebetween;
b) providing a polymeric bag about at least the bottom and sides of each of the plate stacks;
c) applying to the exterior of the bags a coating of a liquid, air-cured, solvent-containing, acid-resistant polymer selected from the group consisting of natural rubber, synthetic rubber and synthetic resin encapsulating material;
d) allowing the encapsulating material to harden; and
e) electrically connecting the plate stacks to form a battery.

* * * * *